(12) United States Patent
Lim et al.

(10) Patent No.: US 8,159,552 B2
(45) Date of Patent: Apr. 17, 2012

(54) APPARATUS AND METHOD FOR RESTORING IMAGE BASED ON DISTANCE-SPECIFIC POINT SPREAD FUNCTION

(75) Inventors: Jae-guyn Lim, Yongin-si (KR);
Joo-young Kang, Yongin-si (KR);
Hyun-wook Ok, Seoul (KR);
Seong-deok Lee, Suwon-si (KR)

(73) Assignees: Samsung Electronics Co., Ltd., Suwon-Si (KR); Samsung Electro-Mechanics Co., Ltd., Suwon-Si (KR)

( * ) Notice: Subject to any disclaimer, the term of this patent is extended or adjusted under 35 U.S.C. 154(b) by 873 days.

(21) Appl. No.: 12/230,166

(22) Filed: Aug. 25, 2008

(65) Prior Publication Data

US 2009/0066818 A1     Mar. 12, 2009

(30) Foreign Application Priority Data

Sep. 12, 2007   (KR) .................. 10-2007-0092745

(51) Int. Cl.
*H04N 5/228* (2006.01)
(52) U.S. Cl. .............. 348/222.1; 382/199; 382/266
(58) Field of Classification Search ............ 348/222.1; 382/199, 266
See application file for complete search history.

(56) References Cited

U.S. PATENT DOCUMENTS 6,628,330 B1    9/2003   Lin
2006/0093234 A1*  5/2006   Silverstein .............. 382/255

FOREIGN PATENT DOCUMENTS

| JP | 5-168029 | 7/1993 |
| JP | 9-84031 | 3/1997 |
| JP | 10-327422 | 12/1998 |
| KR | 10-2001-0038010 | 5/2001 |
| KR | 10-2005-0123347 | 12/2005 |
| KR | 10-2006-0089019 | 8/2006 |

* cited by examiner

*Primary Examiner* — Usman Khan
(74) *Attorney, Agent, or Firm* — Staas & Halsey LLP

(57) ABSTRACT

An apparatus and method for restoring an image are provided. The apparatus includes an edge-strength-detection module which detects an R-channel edge strength, a G-channel edge strength and a B-channel edge strength from an input image and generates an R-channel edge map, a G-channel edge map and a B-channel edge map based on the R-channel edge strength, the G-channel edge strength and the B-channel edge strength; an edge-strength-compensation module which compensates for the R-channel edge strength and the B-channel edge strength based on the G-channel edge strength; a valid-value-generation module which generates a valid value indicating a blur level based on the compensated R-channel edge strength and the compensated B-channel edge strength; a point spread function (PSF) estimation module which estimates a PSF corresponding to the valid value; and an image-restoration module which restores the input image using the PSF.

19 Claims, 9 Drawing Sheets

APPARATUS AND METHOD FOR RESTORING IMAGE BASED ON DISTANCE-SPECIFIC POINT SPREAD FUNCTION

CROSS-REFERENCE TO RELATED APPLICATIONS

This application claims priority from Korean Patent Application No. 10-2007-0092745 filed on Sep. 12, 2007 in the Korean Intellectual Property Office, the disclosure of which is incorporated herein by reference in its entirety.

BACKGROUND

1. Field

One or more embodiments of the present invention relate to an image-processing technique, and, more particularly, to an apparatus and method for restoring an image in which a valid value corresponding to a distance between a subject of an input image and an image sensor is calculated based on a red (R)-channel edge strength, a green (G)-channel edge strength and a blue (B)-channel edge strength of the input image, and it is determined which of R, G and B channels is sharpest based on the valid value and a point spread function (PSF) corresponding to whichever of the R, G and B channels is determined to be sharpest.

2. Description of the Related Art

A deterioration of focus caused by an imprecise adjustment of focal distance is one of the major causes of the deteriorating quality of pictures obtained by image-capturing devices. In order to prevent such deterioration of focus, image-capturing devices equipped with auto-focusing (AF) systems have been commercialized.

In particular, an infrared AF (IRAF) method and a semi-digital AF (SDAF) method have been widely used in conventional image-processing systems. The IRAF method involves determining whether focus is correct, based on the distance traveled by the light with the aid of an interpretation module, and performing focus adjustment by moving a lens according to the result of the determination with the aid of a control module. The SDAF method involves determining whether the focus is correct by calculating high-frequency components with the aid of an interpretation module, and performing focus adjustment, by moving a lens, according to the results of the calculation with the aid of a control module. However, the IRAF method and the SDAF method may not be able to ensure reliability for the operation of an interpretation module, and may require a motor driving module of a moving a lens under the control of a control module. In addition, it is generally time consuming to obtain an in-focus image using the IRAF method or the SDAF method.

In order to address the problems associated with the IRAF method or the SDAF method, the necessity of the replacement of the IRAF method or the SDAF method with a fully digital AF (FDAF) method has arisen. The FDAF method is characterized by restoring an image according to the properties of an image-processing system without the need to drive a lens.

Specifically, in the FDAF method, an interpretation module and a control module may both be realized through digital signal processing. The FDAF method involves estimating a point spread function (PSF) of an input image, instead of measuring the degree of focus with the aid of an interpretation module. The FDAF method also involves providing an in-focus image using a PSF estimated by an interpretation module and using an image restoration technique with the aid of a control module.

In general, in order to estimate a PSF appropriate for an input image, a blur level of the input image may be estimated. Conventionally, a variety of blur estimation methods have been used to estimate a blur level of an input image.

Specifically, a blur level of an input image may be estimated by determining an unknown blur radius based on differences between the input image and a plurality of images. This method, however, may result in errors caused by an input image having a complicated shape, or due to noise. Also, this method may not be able to estimate a PSF corresponding to a distance-specific blur level.

Alternatively, a blur level of an input image may be estimated by detecting red (R), green (G) and blue (B) channels from the input image and comparing the R, G and B channels. This method involves analyzing the correlation between a sharp channel and a blurry channel, and estimating a blur kernel based on the result of the analysis. Still alternatively, a blur level of an input image may be estimated by comparing first and second color channels of an input image, which are classified as high-frequency features of the input image, and extracting information lost from the second color channel due to a blur phenomenon.

However, the above-mentioned blur estimation methods may all result in errors, especially when an input image has a complicated shape. Also, the above-mentioned blur estimation methods may not be able to estimate a PSF corresponding to a distance-specific blur level, even though they are able to determine the relative differences between the blur levels of channels.

Therefore, it is very important to precisely estimate a distance-specific PSF for various images.

SUMMARY

One or more embodiments of the present invention provide an apparatus and method for restoring an input image in which a plurality of valid values, respectively corresponding to a plurality of distance-specific blur levels, are calculated using various input images, and it is determined which of red (R), green (G) and blue (B) channels is sharpest based on a distance between a subject of an input image and an image sensor using the valid values, and a point spread function (PSF) corresponding to whichever of the R, G and B channels is determined to be sharpest is precisely estimated.

Additional aspects and/or advantages will be set forth in part in the description which follows and, in part, will be apparent from the description, or may be learned by practice of the invention.

According to an aspect of the present invention, an apparatus for restoring an image is provided. The apparatus includes an edge-strength-detection module which detects an R-channel edge strength, a G-channel edge strength and a B-channel edge strength from an input image and generates an R-channel edge map, a G-channel edge map and a B-channel edge map based on the R-channel edge strength, the G-channel edge strength and the B-channel edge strength, an edge-strength-compensation module which compensates for the R-channel edge strength and the B-channel edge strength based on the G-channel edge strength, a valid-value-generation module which generates a valid value indicating a blur level based on the compensated R-channel edge strength and the compensated B-channel edge strength, a PSF-estimation module which estimates a PSF corresponding to the valid value, and an image-restoration module which restores the input image using the PSF.

According to another aspect of the present invention, an image-capturing system is provided including a photographing device which photographs an image of a subject, a driving circuit which adjusts a lens and a diaphragm in order for the photographing device to photograph an image of the subject, and an apparatus for restoring an image which removes blurs in the image photographed by the photographing device, wherein the apparatus includes an edge-strength-detection module which detects an R-channel edge strength, a G-channel edge strength and a B-channel edge strength from an input image and generates an R-channel edge map, a G-channel edge map and a B-channel edge map based on the R-channel edge strength, the G-channel edge strength and the B-channel edge strength, an edge-strength-compensation module which compensates for the R-channel edge strength and the B-channel edge strength based on the G-channel edge strength, a valid-value-generation module which generates a valid value indicating a blur level based on the compensated R-channel edge strength and the compensated B-channel edge strength, a PSF-estimation module which estimates a PSF corresponding to the valid value, and an image-restoration module which restores the input image using the PSF.

According to another aspect of the present invention, a method of restoring an image is provided. The method includes detecting an R-channel edge strength, a G-channel edge strength and a B-channel edge strength from an input image and generating an R-channel edge map, a G-channel edge map and a B-channel edge map based on the R-channel edge strength, the G-channel edge strength and the B-channel edge strength, compensating for the R-channel edge strength and the B-channel edge strength based on the G-channel edge strength, generating a valid value indicating a blur level based on the compensated R-channel edge strength and the compensated B-channel edge strength, estimating a PSF corresponding to the valid value, and restoring the input image using the PSF.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
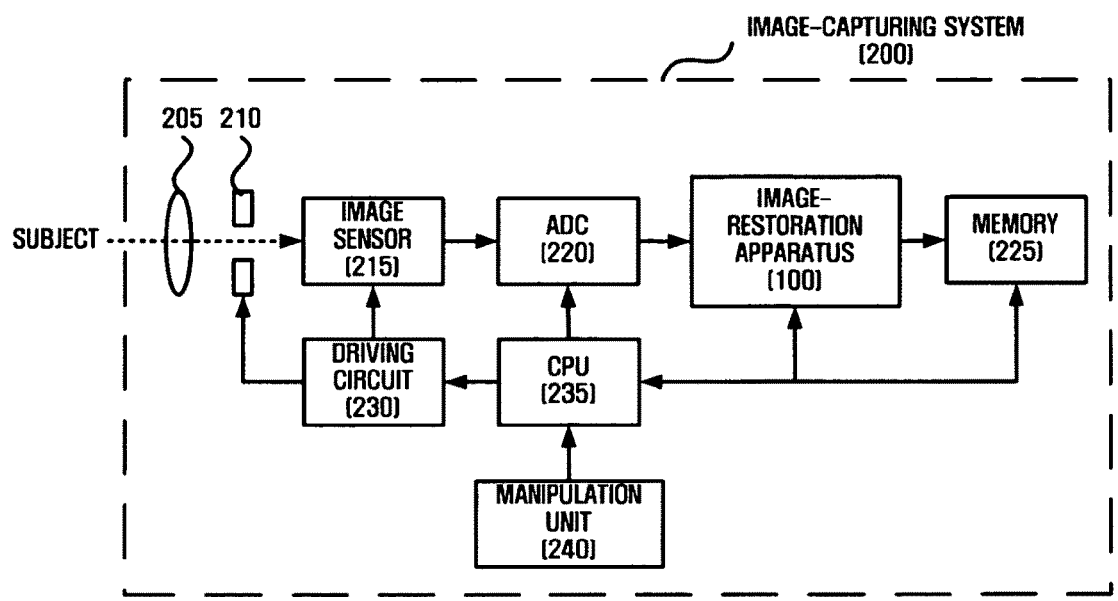
FIG. 1 illustrates an image-capturing system, according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

FIG. 1 illustrates a an image-capturing system 200, according to an embodiment of the present invention. Referring to FIG. 1, the image-capturing system 200 may include, for example, a lens 205, a diaphragm 210, an image sensor 215, an analog-to-digital converter (ADC) 220, an apparatus 100 (hereinafter referred to as the image-restoration apparatus 100) for restoring an image, a memory 225, a driving circuit 230, a central processing unit (CPU) 235, and a manipulation unit 240. The image-capturing system may include various image-processing systems such as a photographing device.

Light from a subject is incident upon the image sensor 215 through the lens 205 and the diaphragm 210. The image sensor 215 converts information regarding the subject into electric image information, and may include an image-capturing tool such as a charge coupled device (CCD) or a complementary metal oxide semiconductor (CMOS) image sensor. An analog image signal formed on a photographing surface of the image sensor 215 is converted into a digital signal by the ADC 220. The digital image signal is input to the image-restoration apparatus 100. The image-restoration apparatus 100 processes the digital image signal input thereto, and thereby enhances the quality of an output image. The image-restoration apparatus 100 will be described later in further detail with reference to FIG. 2.

The image processed by the image-restoration apparatus 100 is stored in the memory 225. The memory 225 may be a nonvolatile memory such as a read-only memory (ROM), a programmable ROM (PROM), an erasable PROM, an electrically erasable PROM (EEPROM), or a flash memory, a volatile memory such as a random access memory (RAM), or a storage medium such as a hard disc or an optical disc.

The manipulation unit 240 applies a signal to the CPU 235, and the CPU 235 applies a control signal to the image-restoration apparatus 100 or to the memory 225 and thus controls the storing of an image compensated for by the image-restoration apparatus 100 in the memory 225. The CPU 235 also applies a control signal to the driving circuit 230 which adjusts the diaphragm 210 or an exposure time (shutter speed) of the image sensor 215, or an automatic gain control (AGC).

Figure 2:
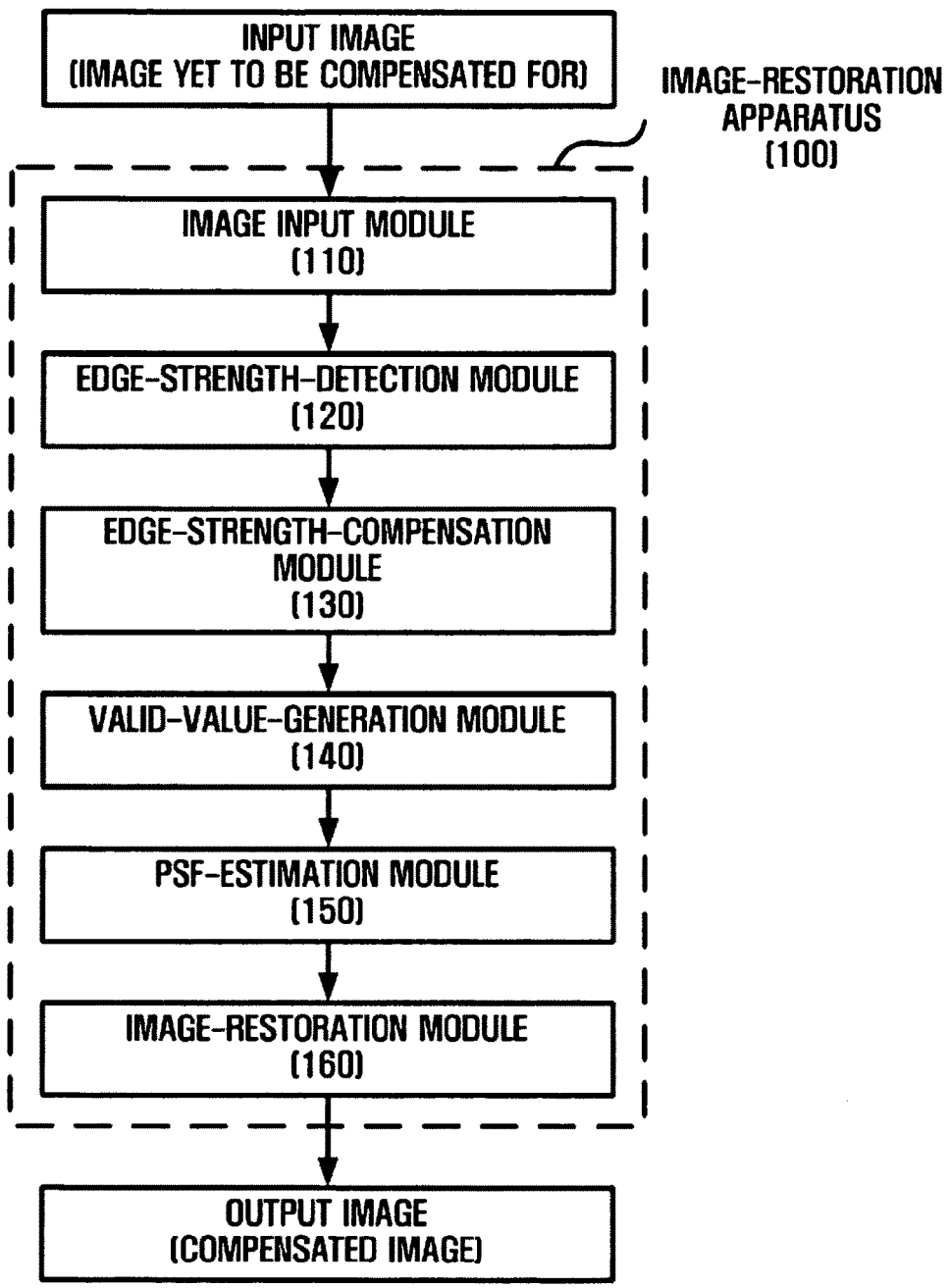
FIG. 2 illustrates an apparatus for restoring an image, according to an embodiment of the present invention.

FIG. 2 illustrates the image-restoration apparatus 100 illustrated in FIG. 1. Referring to FIG. 2, the image-restoration apparatus 100 includes, for example, an image input module 110, an edge-strength-detection module 120, an edge-strength-compensation module 130, a valid-value-generation module 140, a point spread function (PSF) estimation module 150, and an image-restoration module 160.

The image-restoration apparatus 100 may be included in the image-capturing system 200 illustrated in FIG. 1, or may be included in an external device such as a computer, a personal digital assistant (PDA), a portable multimedia player (PMP), or a mobile phone.

The image input module 110 receives an input image stored in a predetermined memory. The image input module 110 may separate a number of components (e.g., RGB or YCbCr) from the input image because an image includes three-dimensional components, rather than including only one component. The image-restoration apparatus 100 applies the same operating principles to the components of the input image.

The edge-strength-detection module 120 detects the edge strengths of red (R), green (G) and blue (B) channels from the input image and generates an R-channel edge map, a G-channel edge map, and a B-channel edge map, based on the results of the detection, in order to calculate the blur levels of the R, G and B channels. A blur level of an image is closely related to the sharpness of the image.

In general, when capturing an image using the image-capturing system 200, differences between the indexes of refraction of rays with different wavelengths result in differences in the formation of an image, and thus generate differences between the degrees of sharpness of R, G and B channels. Therefore, if the locations of the lens 205 and the image sensor 215 are fixed, the formation of an image by the image sensor 215 may be affected by the position of a subject. This phenomenon occurs due to longitudinal chromatic aberration. Chromatic aberration is a variation in the position and size of an image due to the various wavelengths of light, and occurs because the refractive index of optical glass varies according to the wavelengths of light. Longitudinal chromatic aberration is a variation in the position of an image of an on-axis object caused by the various wavelengths of light.

Figure 3:
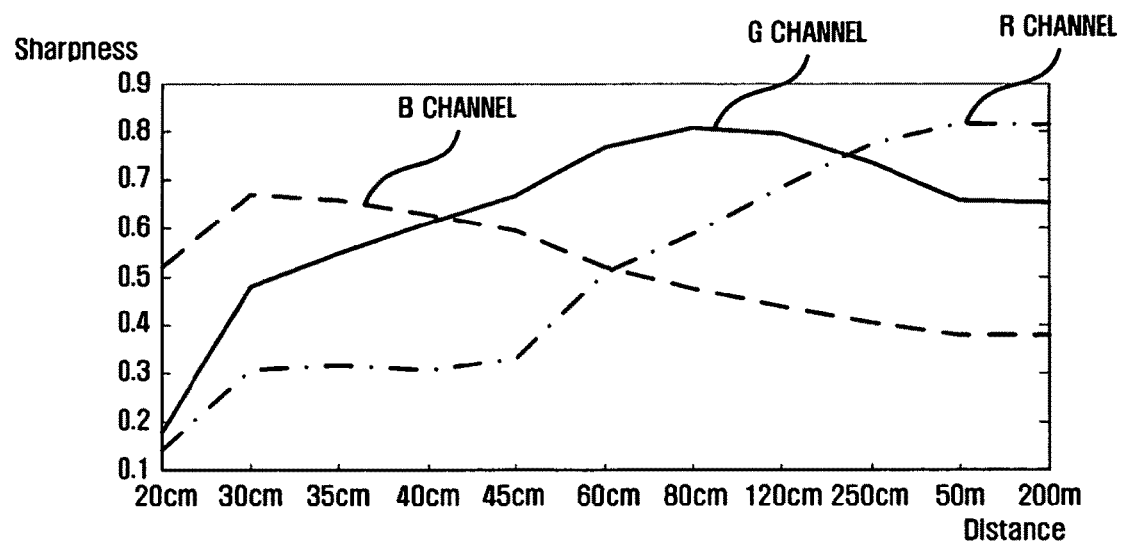
FIG. 3 illustrates a graph for comparing the degrees of sharpness of red (R), green (G) and blue (B) channels for various subject-image sensor distances.

FIG. 3 illustrates a graph for comparing the degrees of sharpness of R, G and B channels for various subject-image sensor distances. Referring to FIG. 3, the degrees of sharpness of R, G and B channels corresponding to a subject-image sensor distance, or the distance between a subject and the image sensor 215 or the lens 205, may be represented by numerical data obtained by converting distance-specific, channel-specific PSF data to MTF50 values. Modulation transfer function (MTF) data is one of the most common object methods for evaluating the performance of lenses, and is obtained by performing a Fourier transform of distance-specific PSF data. MTF50 values are the top half of the MTF data values. MTF50 values may be determined according to a distance and a channel.

Referring to FIG. 3, for a subject relatively close to the image sensor 215, a blur phenomenon occurs in an R channel and a G channel. In contrast, for a subject relatively distant from the image sensor 215, a blur phenomenon occurs in the G channel and a B channel. That is, for a subject close to the image sensor 215, the degree of sharpness of the B channel is highest. In contrast, for a subject distant from the image sensor 215, the degree of sharpness of the R channel is highest. One or more embodiments of the present invention utilize the optical feature where rays with different wavelengths have different indexes of refraction.

Figure 4:
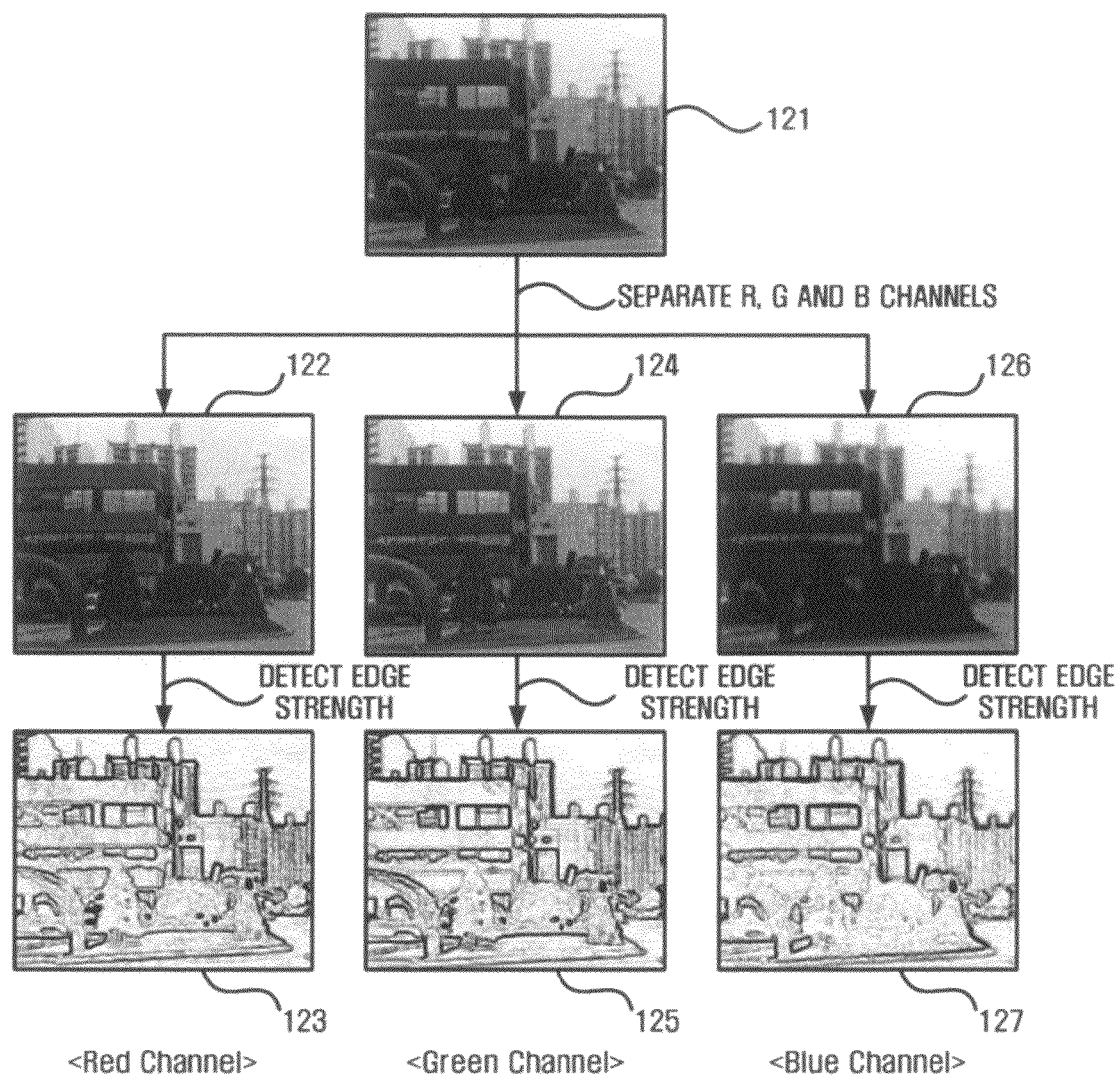
FIG. 4 illustrates the extraction of an R-channel edge strength, a G-channel edge strength and a B-channel edge strength from an input image and the generation of an R-channel edge map, a G-channel edge map and a B-channel edge map based on the R-channel edge strength, the G-channel edge strength and the B-channel edge strength.

FIG. 4 illustrates the detection of R-channel, G-channel and B-channel edge strengths and the generation of R-channel, G-channel and B-channel edge maps, based on the results of the detection. Referring to FIG. 4, an R channel image 122, a G-channel image 124, and a B-channel image 126 may be separated from an input image 121 by the image input module 110.

A high pass filter may be applied to the R-channel image 122, the G-channel image 124, and the B-channel image 126 in order to detect an R-channel edge strength, a G-channel edge strength and a B-channel edge strength from the input image 121. The high pass filter passes signals with a frequency higher than a cut-off frequency well, but attenuates signals with a frequency lower than the cut-off frequency. A Laplacian filter may be used as the high pass filter. The Laplacian filter may be represented by Equation (1) below:

$$\text{Sobel Filter: } X \text{ Direction} \begin{bmatrix} -1 & 0 & 1 \\ -2 & 0 & 2 \\ -1 & 0 & 1 \end{bmatrix}, \quad \text{Equation (2)}$$

$$Y \text{ Direction} \begin{bmatrix} 1 & 2 & 1 \\ 0 & 0 & 0 \\ -1 & -2 & -1 \end{bmatrix}$$

The R-channel edge strength, the G-channel edge strength, and the B-channel edge strength may be detected from the input image 121 using a two-dimensional (2D) filter. A Sobel filter may be used as the 2D filter. The Sobel filter may be represented by Equation (2):

$$<\text{Example 1}> \begin{bmatrix} -1 & -1 & -1 \\ -1 & 8 & -1 \\ -1 & -1 & -1 \end{bmatrix} \quad \text{Laplacian Filter, Equation (1)}$$

$$<\text{Example 2}> \begin{bmatrix} 0 & -1 & 0 \\ -1 & 4 & -1 \\ 0 & -1 & 0 \end{bmatrix}$$

Once the R-channel edge strength, the G-channel edge strength, and the B-channel edge strength are detected from the input image 121 in the above-mentioned manner, an R-channel edge map 123, a G-channel edge map 125, and a B-channel edge map 127 respectively representing the R-channel edge strength, the G-channel edge strength, and the B-channel edge strength are generated. The R-channel edge strength, the G-channel edge strength, and the B-channel edge strength are determined according to the distance between a subject of the input image and the image sensor 215.

Referring to FIG. 2, the edge-strength-compensation module 130 is provided with the R-channel edge strength, the G-channel edge strength, and the B-channel edge strength, which are all detected by the edge-strength-detection module 120. Then, the edge-strength-compensation module 130 compensates for the R-channel edge strength and the B-channel edge strength based on the G-channel edge strength.

In the present embodiment, the R-channel edge strength and the B-channel edge strength are compensated for in order to reduce the influence of noise on various computational processes that involve the use of the R-channel edge strength and the B-channel edge strength. That is, an R-channel edge map and a B-channel edge map, which are less influenced by noise, are generated by compensating for the R-channel edge strength and the B-channel edge strength.

In general, the image sensor 215 is less sensitive to G-channel noise than to R-channel noise or B-channel noise. Thus, the amount of G-channel noise in the input image is less than the amount of R-channel noise or B-channel noise in the input image. Therefore, in order to reduce the probability of R-channel or B-channel noise generated by the image sensor 215 being treated as an edge, major edge strengths are formed using the G channel.

In order to compensate for the R-channel edge strength and the B-channel edge strength, a weight generated based on the G-channel strength may be used.

Figure 5A:
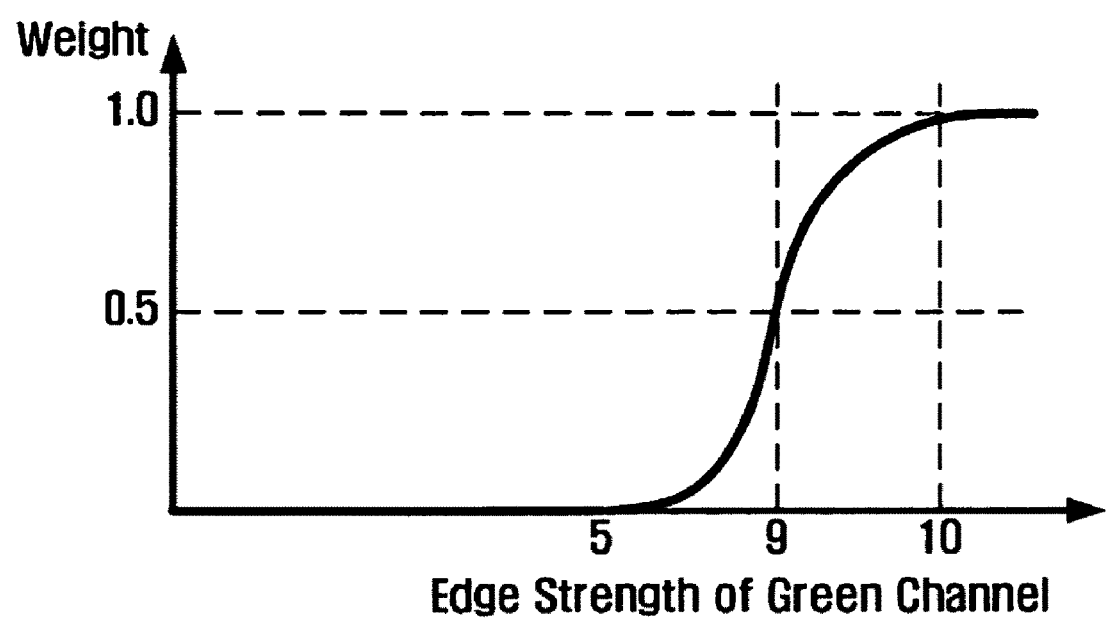
FIG. 5A illustrates a graph of a weight generated based on an edge strength at an arbitrary point (x, y) on a G-channel edge map.
Figure 5B:
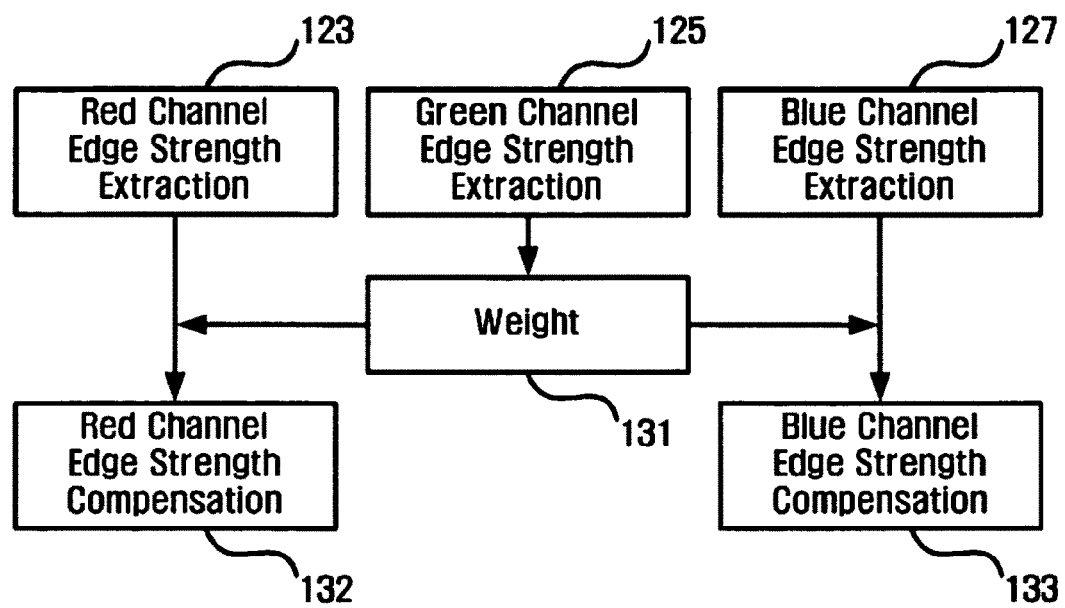
FIG. 5B illustrates the compensation of an R-channel edge strength and a B-channel edge strength using a weight generated based on a G-channel edge strength.

FIG. 5A illustrates a graph of the range of variation of a weight generated based on the edge strength detected from an arbitrary point (x, y) on a G-channel edge map, and FIG. 5B illustrates the compensation of an R-channel edge strength and a B-channel edge strength based on a weight generated based on a G-channel edge strength.

Referring to FIG. 5A, the weight is a relative value indicating the edge strength at the arbitrary point (x, y) on the G-channel edge map, and is normalized to the range of 0 to 1 for the entire range of G-channel edge strengths.

Referring to FIG. 5B, a weight 131 is calculated based on a G-channel edge strength (125) detected by the edge-strength-detection module 120. Thereafter, the weight 131 is applied to an R-channel edge strength (123) and a B-channel edge strength (127), thereby obtaining a compensated R-channel edge strength (132) and a compensated B-channel edge strength (133). This type of compensation may be performed on an entire R-channel edge map, or on an entire B-channel edge map.

The image-restoration apparatus 100 may compensate for the edge strength at an arbitrary point (x, y) on an R-channel edge map or a B-channel edge map, as indicated by Equation (3) below:

$$\text{Red ES Compensation}(x,y) = W \times ES \text{ of Red}(x,y)$$

$$\text{Blue ES Compensation}(x,y) = W \times ES \text{ of Blue}(x,y) \quad \text{Equation (3)}$$

where W indicates a weight corresponding to the edge strength at the arbitrary point (x, y) on a G-channel edge map, ES of Red(x, y) or ES of Blue(x, y) indicates the edge strength at the arbitrary point (x, y) on an R-channel edge map or a B-channel edge map, and Red ES Compensation(x, y) or Blue ES Compensation(x, y) indicates a compensated edge strength at the arbitrary point on the R-channel edge map or the B-channel edge map. That is, the image-restoration apparatus 100 obtains the compensated edge strength Red ES Compensation(x, y) or Blue ES Compensation(x, y) by multiplying the edge strength ES of Red(x, y) or ES of Blue(x, y) by the weight W.

For example, an edge that does not exist on a G-channel edge map but exists only on an R-channel or B-channel edge map corresponds to a weight of 0, and may thus be treated as a nonexistent edge through compensation. That is, an edge that does not exist on a G-channel edge map, but exists only on an R-channel or B-channel edge map, is recognized as noise and is thus removed, thereby reducing the probability of noise being treated as an edge.

Referring to FIG. 2, the valid-value-generation module 140 generates a valid value indicating a blur level based on the compensated R-channel edge strength and the compensated B-channel edge strength provided by the edge-strength-compensation module 130.

The valid value is an absolute value corresponding to the distance between the subject of the input image and the image sensor 215. Therefore, the valid value is not influenced by the shape of the input image. As described above, the valid value is obtained using a compensated R-channel or B-channel edge strength and is also not influenced by noise.

Conventionally, the estimation of a blur level may result in errors due to the shape of an input image or noise. However, the image-restoration apparatus 100, according to the embodiment of FIG. 2, can estimate a blur level based only on a valid value corresponding to the distance between a subject and the image sensor 215, without being affected by the shape of an input image or noise, and can thus address the above-mentioned problems associated with the prior art.

The valid value indicating a blur level may be generated as indicated by Equation (4) below:

$$\text{Valid Value: Ratio} = \frac{\sum \text{Red ES Compensation}}{\sum \text{Blue ES Compensation}} \quad \text{Equation (4)}$$

Referring to Equation (4), the valid value indicating a blur level may be represented by the ratio of the sum of compensated R-channel edge strengths and the sum of compensated B-channel edge strengths. As described above, an R-channel or B-channel edge strength is determined according to the distance between a subject and the image sensor 215, and thus, the valid value indicating a blur level may become an absolute value corresponding to the distance between the subject and the image sensor 215.

Referring to FIG. 3, for a subject relatively close to the image sensor 215, an R-channel edge strength is relatively low and a B-channel edge strength is relatively high. In this case, a valid value is less than 1. In contrast, for a subject distant from the image sensor 215, a valid value is greater than 1.

Referring to FIG. 2, the PSF-estimation module 150 estimates a PSF corresponding to the valid value provided by the valid-value-generation module 140. Specifically, the PSF-estimation module 150 compares the valid value provided by the valid-value-generation module 140 with a plurality of default valid values, respectively obtained from the images of subjects at different distances from the image sensor 215, and determines the distance between the subject of the input image and the image sensor 215 based on the distance between the image sensor 215 and a subject of an image corresponding to the default valid value that matches the valid value provided by the valid-value-generation module 140. Thereafter, the PSF-estimation module 150 estimates a sharpest channel and a PSF based on the sharpest channel and the distance between the subject of the input image and the image sensor 215.

The image-restoration apparatus 100, according to the embodiment of FIG. 2, may use a plurality of valid values respectively obtained from the images of subjects at different distances from the image sensor 215 as default valid values, in order to estimate a PSF corresponding to a predetermined valid value. Specifically, the image-restoration apparatus 100, according to the embodiment of FIG. 2, may use a graph or a table indicating the correspondence between a plurality of valid values respectively obtained from the images of subjects at different distances from the image sensor 215 and the distances between the subjects and the image sensor 215. That is, the image-restoration apparatus 100, according to the embodiment of FIG. 2, may experimentally determine the distance between the subject of the input image and the image sensor 215.

Figure 6:
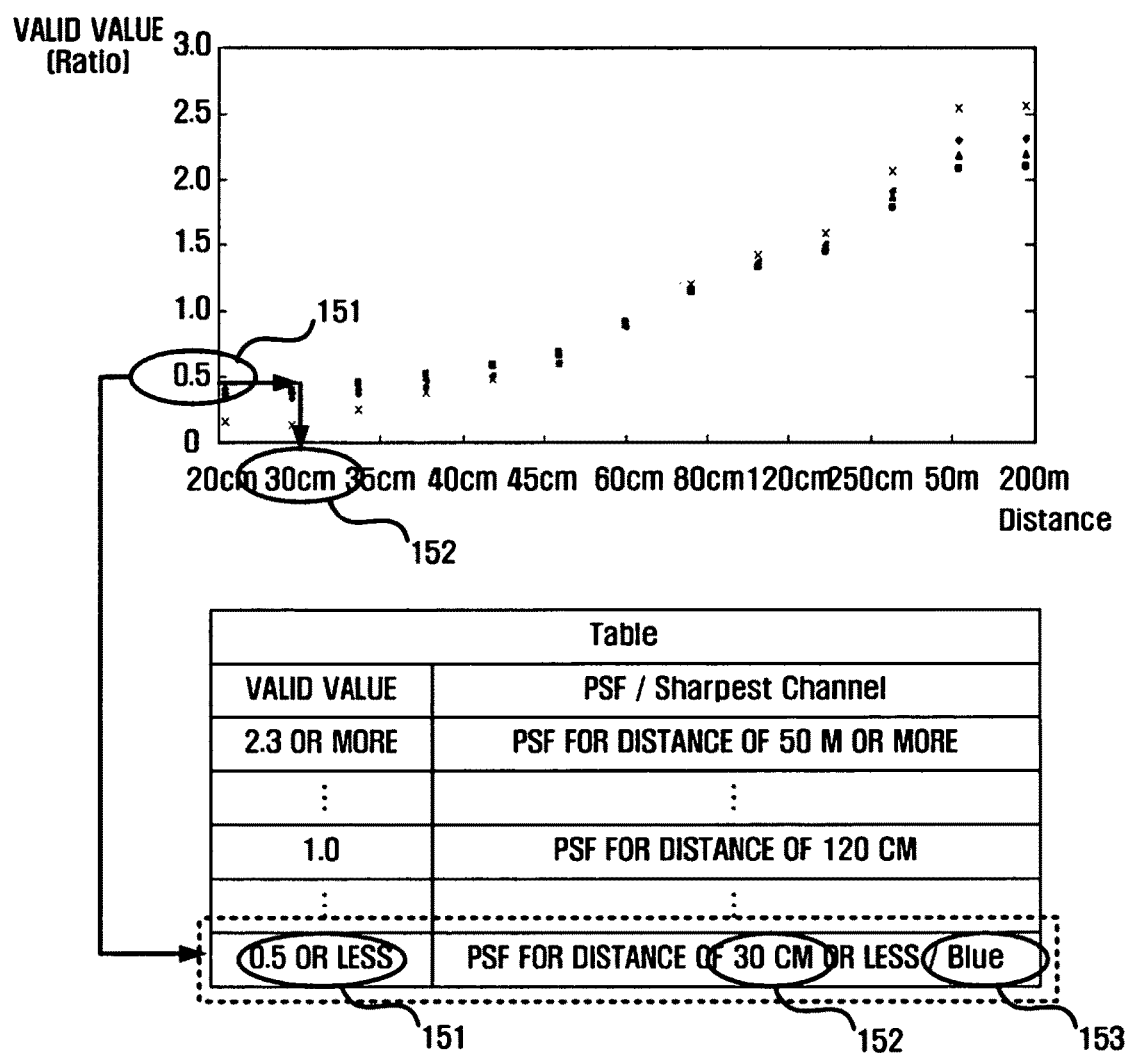
FIG. 6 illustrates a graph indicating the correspondence between a plurality of valid values respectively obtained from the images of subjects at different distances from an image sensor illustrated in FIG. 1 and the distances between the subjects and the image sensor and a table corresponding to the graph.

FIG. 6 illustrates a graph indicating the correspondence between a plurality of valid values respectively obtained from the images of subjects at different distances from the image sensor 215 and the distances between the subjects and the image sensor 215 and a table corresponding to the graph. The correspondence between a plurality of valid values and a plurality of subject-image sensor distances may be determined as follows. First, an R channel, a G channel and a B channel are separated from an image of a subject at a predetermined distance from the image sensor 215. Thereafter, it is determined which of the R channel, the G channel and the B channel is sharpest based on the distance between the subject and the image sensor 215, and a PSF is estimated based on whichever of the R channel, the G channel and the B channel is determined to be sharpest. In general, a PSF corresponding to a lens distance of a photographing device is given as lens specification. Thus, once the distance between a subject and the image sensor 215 is determined, a PSF corresponding to the distance between the subject and the image sensor 215 may be obtained.

Thereafter, an R-channel edge strength, a G-channel edge strength, and a B-channel edge strength are extracted. Subsequently, the R-channel edge strength and the B-channel edge strength are compensated for based on the G-channel edge strength, and a valid value indicating a blur level is obtained from the compensated R-channel edge strength and the compensated B-channel edge strength. The valid value may be obtained using Equation (1).

Thereafter, the relationship between the valid value and the distance between the subject and the image sensor 215 is defined, thereby obtaining the graph of FIG. 6 or a table indicating the relationship among a valid value, the distance between a subject and the image sensor 215, whichever of an R channel, a G channel and a B channel is sharpest at the distance from the image sensor 215, and a PSF.

A PSF may be estimated based on the valid value provided by the valid-value-generation module 140. For example, if the valid value provided by the valid-value-generation module 140 is 0.5 (151), the distance between the subject of the input image and the image sensor 215 may be determined to be about 30 cm, (152) and a B channel corresponding to a distance of 30 cm may be determined as a sharpest channel (153), according to the graph or table of FIG. 6. In this manner, a PSF corresponding to the distance of 30 cm and a B channel may be easily estimated. A distance-specific or channel-specific PSF may easily be obtained using an optical design program, and, thus, a more detailed description of how to obtain a distance-specific or channel-specific PSF will be omitted.

Referring to FIG. 2, the image-restoration module 160 restores the input image using the PSF provided by the PSF-estimation module 150.

The image-restoration module 160 may remove blurs in an image by applying a deconvolution filter to a PSF, and may thus restore the image. Examples of the deconvolution filter include a Wiener filter and a Lucy-Richardson filter.

The Wiener filter $H_w$ is defined by Equation (5) below:

$$H_w(u, v) = \frac{D^*(u, v)}{D^*(u, v)D(u, v) + \frac{S_n(u, v)}{S_i(u, v)}} \quad \text{Equation (5)}$$

where u and v are two coordinate components in a frequency domain, D(u,v) indicates a PSF obtained by converting a PSF to the frequency domain, $D^*(u,v)$ is a conjugate of the PSF D(u,v), $S_n(u,v)$ is a power spectrum of noise, and $S_i(u,v)$ is a power spectrum of an ideal image. The convolution between the Wiener filter $H_w$ and an image portion including a pixel to be filtered is made by applying the Wiener filter $H_w$ to the image portion. In this manner, a filtered pixel value, i.e., a deblurred pixel value can be obtained.

An operation of the image-restoration apparatus 100 will hereinafter be described in detail.

Figure 7:
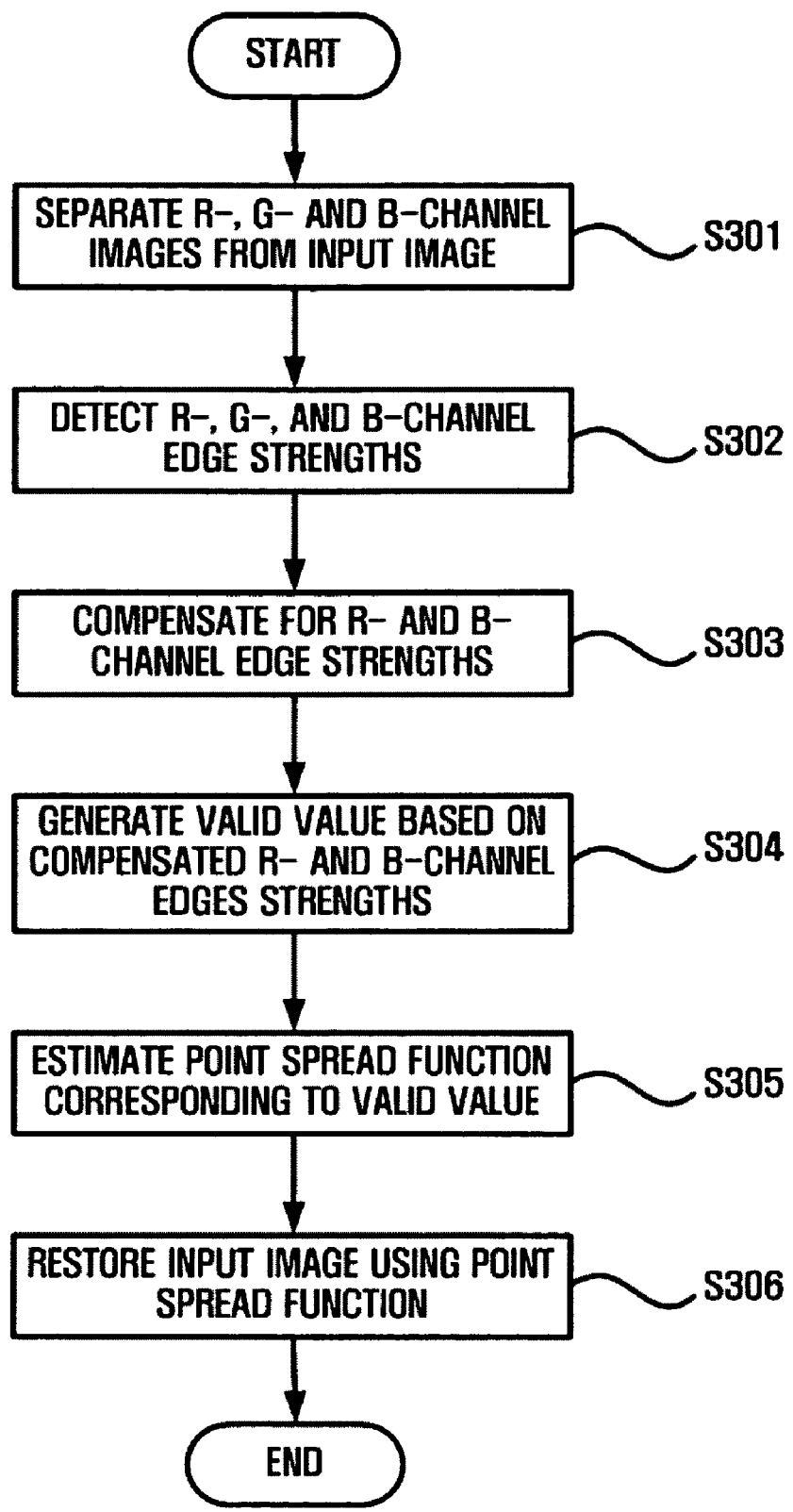
FIG. 7 illustrates a flowchart of a method of restoring an image, according to an embodiment of the present invention.
Figure 8:
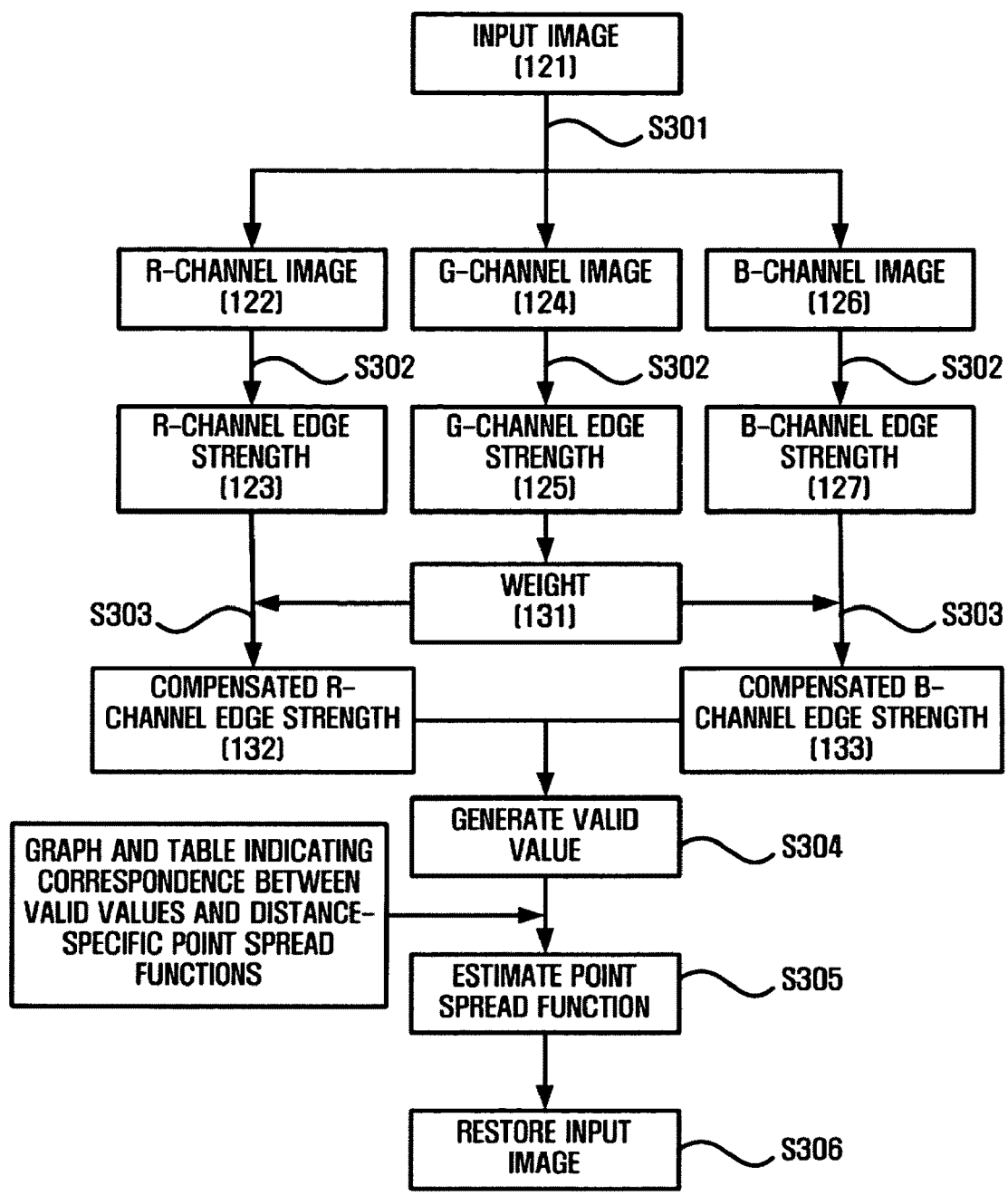
FIG. 8 illustrates a detailed flowchart of the method illustrated in FIG. 7.

FIG. 7 illustrates a flowchart of a method of restoring an image according to an embodiment of the present invention, and FIG. 8 illustrates a detailed flowchart of the method illustrated in FIG. 7.

Referring to FIGS. 7 and 8, an R-channel image (122), a G-channel image (124), and a B-channel image (126) are separated from an input image (121) (S301). Thereafter, an R-channel edge strength (123), a G-channel edge strength (125), and a B-channel edge strength (127) are detected from the input image (121), and an R-channel edge map, a G-channel edge map, and a B-channel edge map are generated based on the R-channel edge strength (123), the G-channel edge strength (125), and the B-channel edge strength (127) (S302).

The R-channel edge strength (123) and the B-channel edge strength (127) are compensated for using the G-channel edge strength (125) (S303), thereby obtaining a compensated R-channel edge strength (132) and a compensated B-channel edge strength (133). In this manner, an R-channel edge map and a B-channel edge map that are not affected by noise are generated.

Thereafter, a valid value indicating a blur level is generated based on the compensated R-channel edge strength (132) and the compensated B-channel edge strength (133) (S304). The valid value obtained in operation S304 is not affected by the shape of the input image (121) or noise, and corresponds to the distance between a subject of the input image (121) and the image sensor 215. The valid value obtained in operation S304 may be obtained using Equation (1).

Thereafter, a PSF corresponding to the valid value obtained in operation S304 is estimated S305.

Specifically, the valid value obtained in operation S304 may be compared with a plurality of default valid values, respectively obtained from the images of subjects at various distances from the image sensor 215, and the distance between the subject of the input image (121) and the image sensor 215 may be determined based on the default valid value that matches the valid value obtained in operation S304. Thereafter, it may be determined which of the R, G and B channels is sharpest based on the distance between the subject of the input image (121) and the image sensor 215, and then a PSF may be estimated, the PSF corresponding to whichever of the R, G and B channels is determined to be sharpest. In operation S305, a graph or a table indicating the correspondence between a plurality of valid values and a plurality of subject-image sensor distances may be used.

Thereafter, the input image (121) is restored using the PSF obtained in operation S305 (S306).

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for restoring an image, comprising:
   an edge-strength-detection module which detects a red (R)-channel edge strength, a green (G)-channel edge strength and a blue (B)-channel edge strength from an input image and generates an R-channel edge map, a G-channel edge map and a B-channel edge map based on the R-channel edge strength, the G-channel edge strength and the B-channel edge strength;
   an edge-strength-compensation module which compensates for the R-channel edge strength and the B-channel edge strength based on the G-channel edge strength;
   a valid-value-generation module which generates a valid value indicating a blur level based on the compensated R-channel edge strength and the compensated B-channel edge strength;
   a point spread function (PSF) estimation module which estimates a PSF corresponding to the valid value; and an image-restoration module which restores the input image using the PSF.

2. The apparatus of claim 1, wherein the edge-strength-detection module detects the R-channel edge strength, the G-channel edge strength and the B-channel edge strength using a high-pass filter.

3. The apparatus of claim 2, wherein the high-pass filter comprises a Laplacian filter.

4. The apparatus of claim 1, wherein the edge-strength-compensation module compensates for the R-channel edge strength and the B-channel edge strength using a weight which is generated based on the G-channel edge strength.

5. The apparatus of claim 4, wherein the edge-strength-compensation module obtains the compensated R-channel edge strength or the compensated B-channel edge strength by multiplying the R-channel edge strength or the B-channel edge strength by the weight.

6. The apparatus of claim 1, wherein the valid value is a ratio of the sum of compensated R-channel edge strengths and the sum of compensated B-channel edge strengths.

7. The apparatus of claim 1, wherein the PSF-estimation module compares the valid value with a plurality of default valid values, determines a distance between a subject of the input image and an image sensor based on a default valid value that matches the valid value, determines which of R, G and B channels is sharpest based on the distance between the subject of the input image and the image sensor, and estimates a PSF corresponding to whichever of the R, G and B channels is determined to be sharpest, the default valid values being respectively obtained from a plurality of images of subjects at different distances from the image sensor.

8. The apparatus of claim 1, wherein the image-restoration module restores the input image by applying a deconvolution filter to the PSF and thus removing blurs in the input image.

9. The apparatus of claim 8, wherein the deconvolution filter comprises a Wiener filter or a Lucy-Richardson filter.

10. An image-capturing system comprising:
a photographing device which photographs an image of a subject;
a driving circuit which adjusts a lens and a diaphragm in order for the photographing device to photograph an image of the subject; and
an apparatus for restoring an image which removes blurs in the image photographed by the photographing device,
wherein the apparatus comprises:
an edge-strength-detection module which detects an R-channel edge strength, a G-channel edge strength and a B-channel edge strength from an input image, and generates an R-channel edge map, a G-channel edge map and a B-channel edge map based on the R-channel edge strength, the G-channel edge strength and the B-channel edge strength;
an edge-strength-compensation module which compensates for the R-channel edge strength and the B-channel edge strength based on the G-channel edge strength;
a valid-value-generation module which generates a valid value indicating a blur level based on the compensated R-channel edge strength and the compensated B-channel edge strength;

a PSF-estimation module which estimates a PSF corresponding to the valid value; and
an image-restoration module which restores the input image using the PSF.

11. A method of restoring an image, comprising:
detecting an R-channel edge strength, a G-channel edge strength and a B-channel edge strength from an input image and generating an R-channel edge map, a G-channel edge map and a B-channel edge map based on the R-channel edge strength, the G-channel edge strength and the B-channel edge strength;
compensating for the R-channel edge strength and the B-channel edge strength based on the G-channel edge strength;
generating a valid value indicating a blur level based on the compensated R-channel edge strength and the compensated B-channel edge strength;
estimating a PSF corresponding to the valid value; and
restoring, by way of a processor, the input image using the PSF.

12. The method of claim 11, wherein the detecting the R-channel edge strength, the G-channel edge strength and the B-channel edge strength, comprises detecting the R-channel edge strength, the G-channel edge strength and the B-channel edge strength using a high-pass filter.

13. The method of claim 12, wherein the high-pass filter comprises a Laplacian filter.

14. The method of claim 11, wherein the compensating for the R-channel edge strength and the B-channel edge strength, compensating for the R-channel edge strength or the B-channel edge strength using a weight which is generated based on the G-channel edge strength.

15. The method of claim 14, wherein the compensating for the R-channel edge strength and the B-channel edge strength further comprises obtaining the compensated R-channel edge strength or the compensated B-channel edge strength by multiplying the R-channel edge strength or the B-channel edge strength by the weight.

16. The method of claim 11, wherein the valid value is a ratio of the sum of compensated R-channel edge strengths and the sum of compensated B-channel edge strengths.

17. The method of claim 11, wherein the estimating of the PSF comprises comparing the valid value with a plurality of default valid values, determining a distance between a subject of the input image and an image sensor based on a default valid value that matches the valid value, determining which of R, G and B channels is sharpest based on the distance between the subject of the input image and the image sensor, and estimating a PSF corresponding to whichever of the R, G and B channels is determined to be sharpest, the default valid values being respectively obtained from a plurality of images of subjects at different distances from the image sensor.

18. The method of claim 11, wherein the restoring the input image comprises restoring the input image by applying a deconvolution filter to the PSF, and thus removing blurs in the input image.

19. The method of claim 18, wherein the deconvolution filter comprises a Wiener filter or a Lucy-Richardson filter.

* * * * *